United States Patent [19]

Kawai et al.

[11] Patent Number: 4,484,099
[45] Date of Patent: Nov. 20, 1984

[54] PIEZOELECTRIC VIBRATION WAVE MOTOR WITH MULTIPLE TRAVELING WAVE GENERATING MEMBERS

[75] Inventors: Tohru Kawai; Makoto Katsuma, both of Kawasaki; Hiroyasu Murakami, Tokyo; Akira Hiramatsu; Naoya Kaneda, both of Yokohama, all of Japan

[73] Assignee: Canon Kabushiki Kaisha, Tokyo, Japan

[21] Appl. No.: 560,527

[22] Filed: Dec. 12, 1983

[30] Foreign Application Priority Data

Dec. 21, 1982 [JP] Japan .................................. 57-224398

[51] Int. Cl.$^3$ ............................................ H01L 41/08
[52] U.S. Cl. ..................................... 310/317; 310/328; 310/323

[58] Field of Search ................................ 310/321–323, 310/328, 317

[56] References Cited

U.S. PATENT DOCUMENTS 4,019,073  4/1977  Vishnevsky et al. ............... 310/322

Primary Examiner—Mark O. Budd
Attorney, Agent, or Firm—Fitzpatrick, Cella, Harper & Scinto

[57] ABSTRACT

In a vibration motor, electrostrictive elements arranged or polarized phase-differentially are bonded to a plurality of concentric ring-shaped vibration members arranged on at least one of a stator and a rotor, voltages are applied to the electrostrictive elements to generate travelling vibration waves in the vibration members and the rotor contacting to the vibration members is friction-driven by the travelling vibration wave.

5 Claims, 6 Drawing Figures

PIEZOELECTRIC VIBRATION WAVE MOTOR WITH MULTIPLE TRAVELING WAVE GENERATING MEMBERS

BACKGROUND OF THE INVENTION

1. Field of the Invention

The present invention relates to an improvement in a structure of a vibration wave motor driven by a travelling vibration wave.

2. Description of the Prior Art

As shown in the U.S. Pat. No. 4,019,073, a vibration wave motion transduces a vibration motor created in an electrostrictive element, when a periodic voltage is applied thereto, to a rotating or linear motion. Since it requires no winding, unlike a conventional electric motor, it is simple in structure and compact, presents a high torque at a low rotating speed and has a low inertia moment.

However, in the known vibration wave motor, in transducing the vibration motion to the rotating motion, a movable member such as a rotor which contacts a vibration motor is unidirectionally friction-driven by a standing vibration wave generated in the vibration member. Therefore, the movable member friction-contacts the vibration member in a forward motion of the vibration and is separated from the vibration member in a reverse motion of the vibration. As a result, the vibration member and the movable member must be in contact with each other within a small distance, that is, essentially in a point or line contact. Thus, the friction-drive efficiency is low.

Since a drive force acts in only a given direction, the movement of the movable member is unidirectional. In order to move the movable member reversely, it is necessary to mechanically switch the direction of vibration by another vibration member. Thus, in order to provide a reversibly rotating vibration wave motor, a complex device is necessary. This reduces the advantages of the vibration wave motor, that is, simple structure and compactness.

In order to resolve the above problem, a vibration wave motor driven by a travelling vibration wave has recently been proposed.

FIG. 1 shows a developed view of such a vibration wave motor.

A vibration absorber 4, a metal ring vibration member 2 having an electrostrictive element 3 bonded thereon and a movable member 1 are inserted, in this order, to a central cylinder 5a of a stator 5 which serves as a base. The stator 5, the absorber 4 and the vibration member 2 are mounted such that they do not rotate with respect to each other. The movable member 1 is press-contacted to the vibration member 2 by a gravity or biasing means, not shown, to maintain the integrity of the motor. A plurality of electrostrictive elements 3a are arranged at a pitch of one half of a wavelength λ of a vibration wave and a plurality of electrostrictive elements 3b are also arranged at a pitch of λ/2. The plurality of electrostrictive elements 3 may be a single ring-shaped element polarized at the pitch of λ/2. The electrostrictive elements 3a and 3b are phase-differentially arranged at a mutual pitch of $(n_o+\frac{1}{4})\lambda$ where $n_o=0, 1, 2, 3, \ldots$. Lead wires 7a are connected to the respective electrostrictive elements 3a and lead wires 7b are connected to the respective electrostrictive elements 3b, and the lead wires 7a and 7b are connected to an AC power supply 6a and a 90° phase shifter 6b, respectively (see FIG. 2). A lead wire 7c is connected to the metal vibration member 2 and it is also connected to the AC power supply 6a.

A friction area 1a of the movable member 1 is made of hard rubber to increase the friction force and reduce abrasion and it is press-contacted to the vibration member 2.

FIG. 2 illustrates the generation of the vibration wave in the motor. While the electrostrictive elements 3a and 3b bonded to the metal vibration member 2 are shown adjacent to each other for the sake of convenience of explanation, they meet the requirement of the λ/4 phase shift and are essentially equivalent to the arrangement of the electrostrictive elements 3a and 3b of the motor shown in FIG. 1. Symbols ⊕ in the electrostrictive elements 3a and 3b indicate that the electrostrictive elements expand in a positive cycle of the AC voltage, and symbols ⊖ indicate that they shrink in the positive cycle.

The metal vibration member 2 is used as one of the electrodes for the electrostrictive elements 3a and 3b, an AC voltage of $V = Vo \sin \omega t$ is applied to the electrostrictive elements 3a from the AC voltage supply 6a, and a voltage of $V = Vo \sin(\omega t \pm \pi/2)$ which is phase-shifted by λ/4 is applied to the electrostrictive elements 3b from the AC power supply 6a through the 90° phase shifter 6b. A sign "+" or "−" in the above equation is selected by the phase shifter 6b depending on the direction of movement of the movable member 1 (not shown in FIG. 2). When the sign "+" is selected, the phase is shifted by +90° and the movable member 1 is moved forwardly, and when the sign "−" is selected the phase is shifted by −90° and the movable member 1 is moved reversely. Let us assume that the sign "−" is selected and the voltage of $V = Vo \sin(\omega t - \pi/2)$ is applied to the electrostrictive elements 3b. When only the electrostrictive elements 3a are vibrated by the voltage of $V = Vo \sin \omega t$, a standing vibration wave shown in FIG. 2(a) is generated, and when only the electrostrictive elements 3b are vibrated by the voltage of $V = Vo \sin(\omega t - \pi/2)$, a standing vibration wave as shown in FIG. 2(b) is generated. When the two voltages having the phase difference therebetween are simultaneously applied to the electrostrictive elements 3a and 3b, the vibration wave travels. FIG. 2(c) shows a waveform at a time $t = 2n\pi/\omega$, FIG. 2(d) shows a waveform at a time $t = \pi/2\omega + 2n\pi/\omega$, FIG. 2(e) shows a waveform at a time $t = \pi/\omega + 2n\pi/\omega$ and FIG. 2(f) shows a waveform at a time $t = 3\pi/2\omega + 2n\pi/\omega$. A wavefront of the vibration wave travels in an x-direction.

Such a travelling vibration wave includes a longitudinal wave and a lateral wave. Noting a mass point A of the vibration member 2 shown in FIG. 3, it makes a clockwise rotating elliptic motion by a longitudinal amplitude u and a lateral amplitude w. Since the movable member 1 is press-contacted to the surface of the vibration member 2 and it contacts to only an apex of the vibration plane, it is driven by component of the longitudinal amplitude u of the eliptic motion of mass points A, A', ... at the apexes so that the movable member 1 is moved in a direction of an arrow N.

When the phase is shifted by +90° by the 90° phase shifter, the vibration wave travels in a −x direction and the movable member 1 is moved oppositely to the direction N.

Thus, the vibration wave motor driven by the travelling vibration wave can switch the forward and reverse rotations with a very simple construction.

A velocity of the mass point A at the apex is represented by $V=2\pi fu$ (where f is a vibration frequency) and a velocity of the movable member 1 depends on it and also depends on the lateral amplitude w because of the friction drive by the press-contact. Thus, the velocity of the movable member 1 is proportional to the magnitude of the elliptic motion of the mass point A and the magnitude of the elliptic motion is proportional to the voltage applied to the electrostrictive elements.

Since the movable member 1 is friction driven at the apex of the wavefront of the travelling vibration wave of the vibration member 2, it is necessary that the wavefront in the direction of apex (z-axis direction in FIG. 3) resonates in order to improve the drive efficiency. A circumference of the vibration member 2 which is vibrated by the frequency $f (=2\pi\omega)$ of the input voltage resonates when the circumference is a natural number multiple of a vibration wavelength $\lambda_1$. That is, it resonates when $$D = n\lambda_1/\pi$$

where D is a diameter of the vibration member 2.

Thus, the resonation in the z-axis direction at the wavelength $\lambda_1$ is limited within a small range of the diameter D, and when the ring width of the vibration member 2 is large, the drive efficiency is lowered.

SUMMARY OF THE INVENTION

It is an object of the present invention to provide a vibration wave motor having an improved drive efficiency, which has a plurality of vibration members of small ring width having electrostrictive elements bonded thereto.

Other objects of the present invention will be apparent from the following description of the preferred embodiments of the present invention.

DETAILED DESCRIPTION OF THE PREFERRED EMBODIMENT

Figure 1:
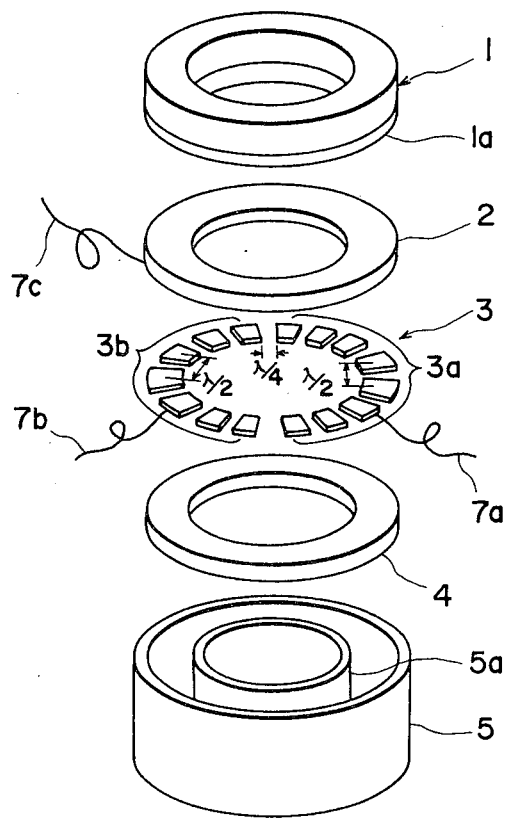
FIG. 1 is a developed view of a prior art vibration wave motor.
Figure 2:
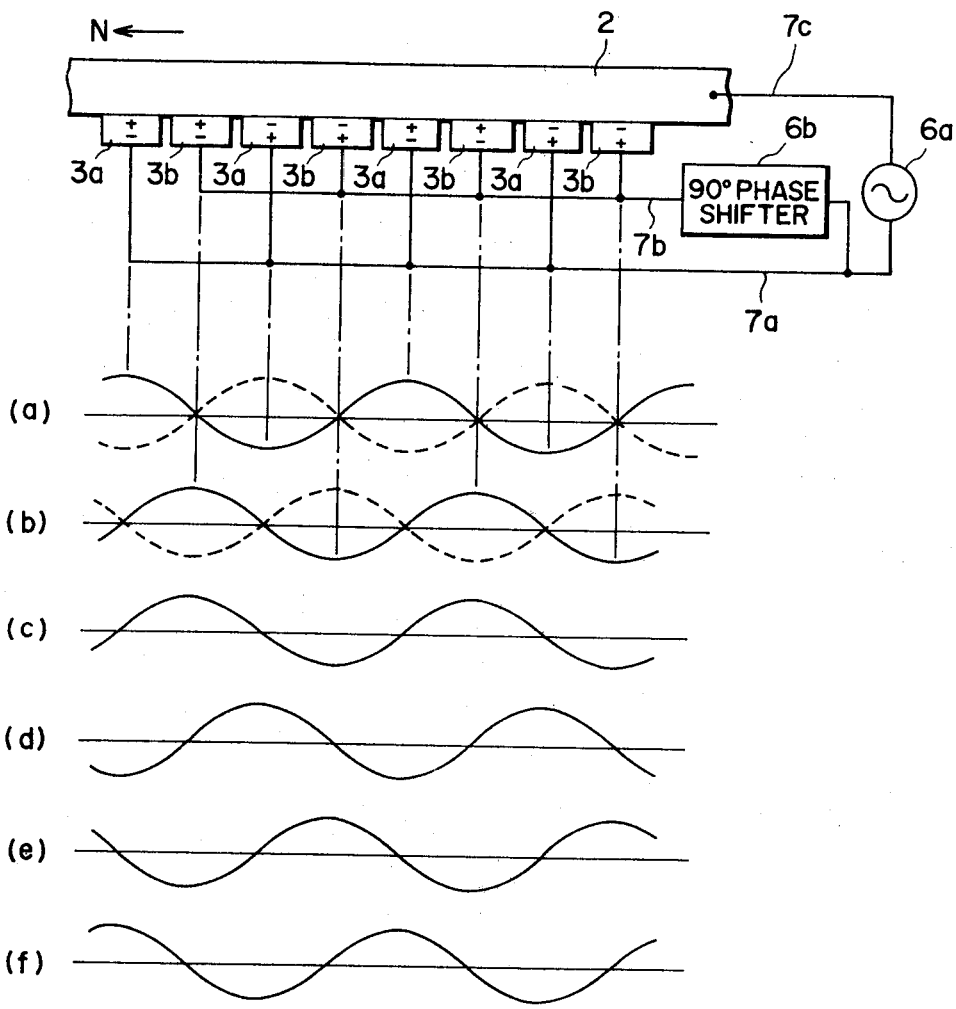
FIG. 2 illustrates the drive of the vibration wave motor.
Figure 3:
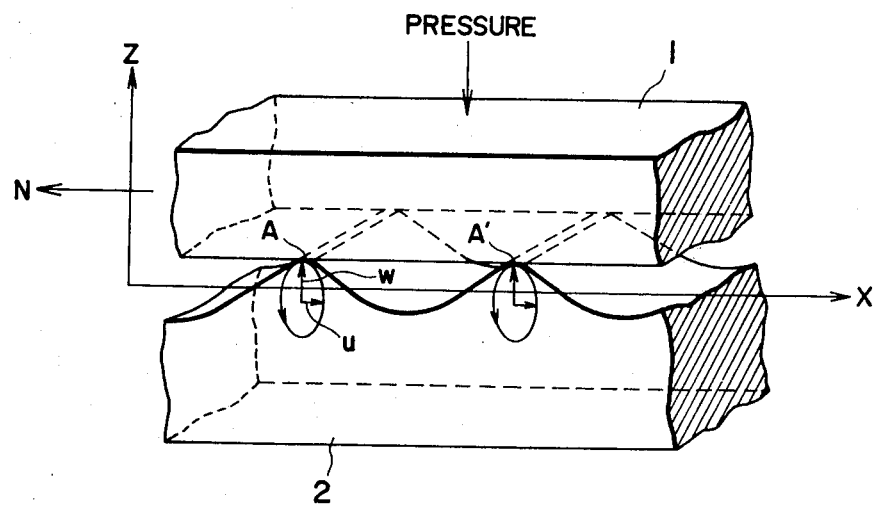
FIG. 3 illustrates a principle of the vibration wave motor.
Figure 4:
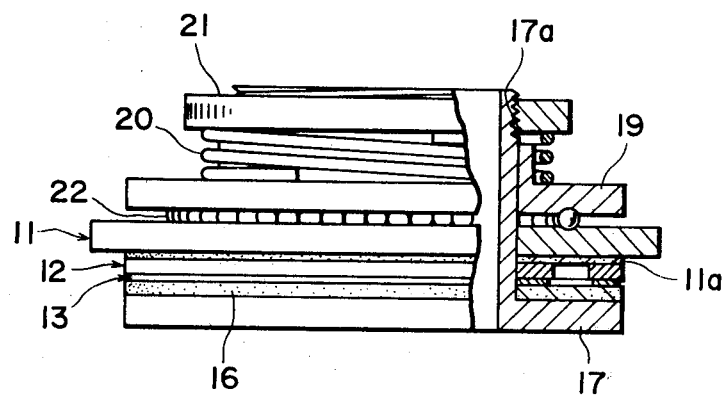
FIG. 4 shows one embodiment of the vibration wave motor of the present invention.

FIG. 4 shows an overall view of a vibration wave motor. A vibration absorber 16 and a multi-ring vibration member 12 having electrostrictive elements 13 bonded to the surface thereof facing the absorber 16 are inserted, in this order, to a central cylinder 17a of a stator 17. Those elements are mounted such that they do not rotate with respect to each other. A rotor 11 is press-contacted to the vibration member 12 by a thrust bearing 19 biased by a spring 20 and an adjusting screw ring 21. Bearings 22 are provided between the bearing 19 and the rotor 11 to reduce frictional resistance. The vibration member 12 may be attached to the rotor 11.

Figure 5:
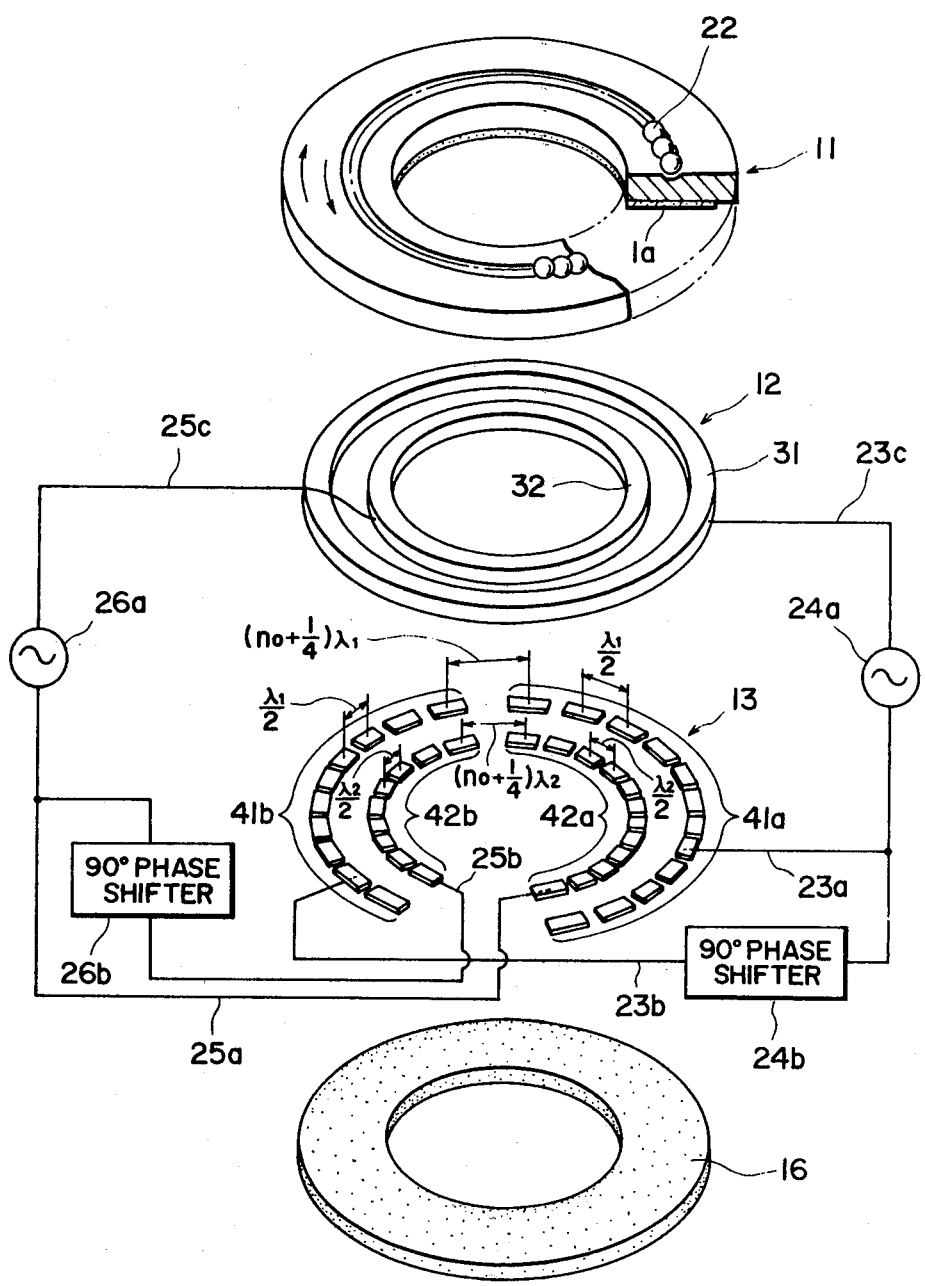
FIG. 5 shows a detail of major elements in FIG. 4 and a drive circuit.

FIG. 5 shows a developed view of the absorber 16, the electrostrictive elements 13, the vibration members 12 and the rotor 11.

The absorber 16 is made of rubber or felt and serves to prevent the attenuation of the vibration on the lower surface of the vibration member 12 and the transmission of the vibration to the stator 17.

The vibration member 12 comprises concentric outer ring 31 and inner ring 32. The electrostrictive elements 13a comprise electrostrictive elements 41a and 41b which are bonded to the outer ring vibration member 31 and electrostrictive elements 42a and 42b which are bonded to the inner ring vibration member 32. By the multi-ring arrangement of the vibration member 12 and the electrostrictive elements 13, the drive efficiency is improved by a reason to be described later.

The plurality of electrostrictive elements 41a are arranged at a pitch of one half of a wavelength $\lambda_1$ of the vibration wave of the vibration member 31 and the plurality of electrostrictive elements 41b are also arranged at the pitch of $\lambda_1/2$. The plurality of electrostrictive elements 41a (or 41b) may be a single element polarized at the pitch of $\lambda_1/2$. The electrostrictive elements 41a and 41b are phase-differentially arranged at a mutual pitch of $(n_o+174)\lambda_1$, where $n_o=0, 1, 2, 3, \ldots$.

Lead wires 23a are connected to the respective electrostrictive elements 41a and lead wires 23b are connected to the respective electrostrictive elements 41b. The lead wires 23a and 23b are connected to an AC power supply 24a and a 90° phase shifter 24b, respectively. The metal vibration member 31 serves as one of electrodes for the electrostrictive elements 41a and 41b and it is connected to the AC power supply 24a through a lead wire 23c.

The electrostrictive elements 42a and 42b are also arranged or polarized at a pitch of one half of a wavelength $\lambda_2$ of the vibration wave of the vibration member 32. The electrostrictive elements 41a and 41b and the electrostrictive elements 42a and 42b are arranged at the same angular pitch.

Lead wires 25a are connected to the respective electrostrictive elements 42a and lead wires 25b are connected to the respective electrostrictive elements 42b. The lead wires 25a and 25b are connected to an AC power supply 26a and a 90° phase shifter 26b, respectively. The metal vibration member 32 serves as one of electrodes for the electrostrictive elements 42a and 42b and it is connected to the AC power supply 26a through a lead wire 25c.

A friction area 11a of the rotor 11 is made of hard rubber in order to increase the friction force and reduce abrasion.

An AC voltage having a frequency $f_1$ is applied to the electrostrictive elements 41a and 41b from the power supply 24a to resonate the vibration member 31 having a ring diameter $D_1$ at the wavelength $\lambda_1$ by the electrostrictive elements 41a and 41b. An AC voltage having a frequency $f_2$ is applied to the electrostrictive elements 42a and 42b from the power supply 26a to resonate the vibration member 32 having a ring diameter $D_2$ at the wavelength $\lambda_2$ by the electrostrictive elements 42a and 42b. The rotor 11 is rotated by the drive by the vibration members 31 and 32.

Figure 6:
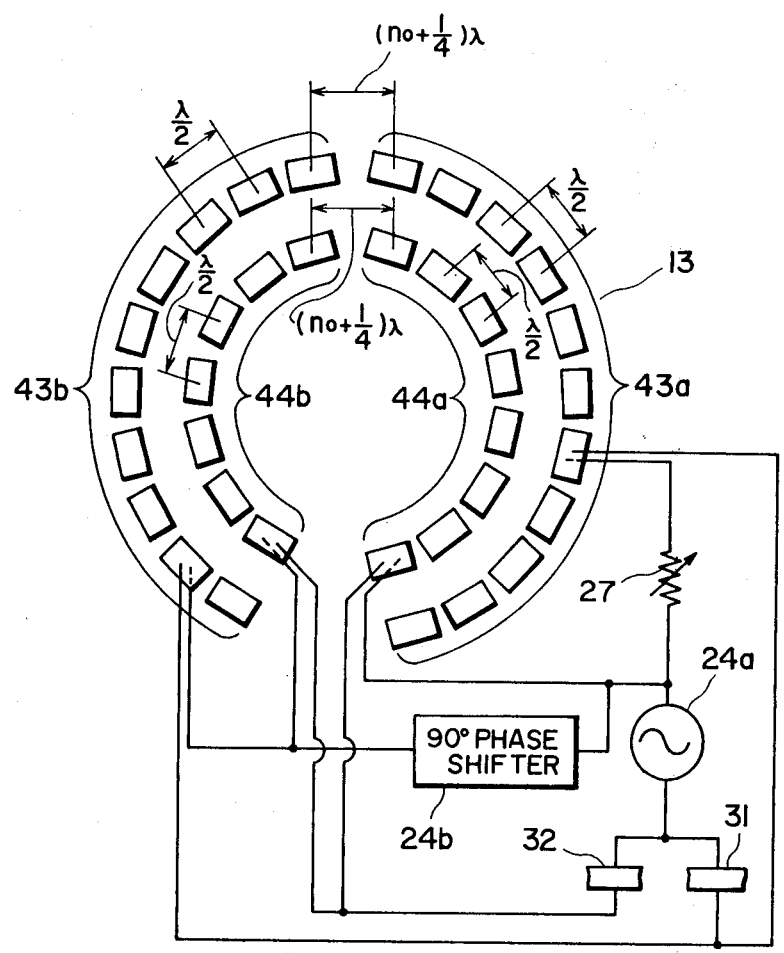
FIG. 6 shows a modification of the drive circuit shown in FIG. 5.

FIG. 6 shows another embodiment of the arrangement of the electrostrictive elements 13 and the connection between the electrostrictive elements 13 and the drive power sources.

Electrostrictive elements 43a and 43b are bonded to the outer ring vibration member 31 at a pitch of one half of a wavelength λ of the vibration wave of the vibration member 31. The electrostrictive elements 43a and 43b are phase-differentially arranged at a mutual pitch of $(n_o+\frac{1}{4})\lambda$.

Electrostrictive elements 44a and 44b are bonded to the inner ring vibration member 32 at the same pitch of λ/2 as that for the vibration member 31, and they are also phase-differentially arranged.

A voltage of V=Vo sin ωt is applied to the electrostrictive elements 43a and 44a from the AC power supply 24a, and a voltage of V=Vo sin (ωt−π/2) or V=Vo sin (ωt+π/2) is applied to the electrostrictive elements 43b and 44b from the AC power supply 24a through the 90° phase shifter.

Since both the vibration members 31 and 32 resonate at the vibration frequency f, the ring diameters $D_1$ and $D_2$ of the outer ring vibration member 31 and the inner ring vibration member 32 are selected such that the respective ring circumferences $\pi D_1$ and $\pi D_2$ are natural number multiples of the vibration wavelength λ, that is, $\pi D_1 = n_1 \lambda$ and $\pi D_2 = n_2 \pi$ are met.

The voltage may be adjusted by a resistor 27 so that the longitudinal amplitude components of the vibration members 31 and 32 are adjusted to equalize the drive angular velocities of the outer ring 31 and the inner ring 32 to the rotor 11.

According to the vibration wave motor of the present invention, since a plurality of vibration members are arranged to drive the rotor, a high torque is attained. Further, since the ring widths of the vibration members are small, a loss of the drive efficiency is prevented.

While two outer and inner ring vibration members are used as the vibration member 12 in the above embodiment, the vibration member may comprise three or more members.

What we claim is:
1. A vibration wave motor comprising:
   first electrostrictive elements arranged or polorized phase-differentially;
   second electrostrictive elements arranged or polarized phase-differentially;
   a first vibration member for generating a travelling vibration wave when voltages having a phase difference are applied to said first electrostrictive elements;
   a second vibration member for generating a travelling vibration wave when voltages having a phase difference are applied to said second electrostrictive elements; and
   a movable member press-contacted to and friction-driven by said first vibration member and said second vibration member.

2. A vibration wave motor according to claim 1, wherein said voltages applied to said first electrostrictive elements and said voltages applied to said second electrostrictive elements are supplied from different power supplies.

3. A vibration wave motor according to claim 1, wherein said voltages applied to said first electrostrictive elements and said voltages applied to said second electrostrictive elements are supplied from the same power supply.

4. A vibration wave motor according to claim 1, wherein said first electrostrictive elements include a plurality of phase-differentially arranged or polarized electrostrictive elements mounted on said first vibration member.

5. A vibration wave motor according to claim 4, wherein said second electrostrictive elements include a plurality of phase-differentially arranged or polarized electrostrictive elements mounted on said second vibration member.

* * * * *

UNITED STATES PATENT AND TRADEMARK OFFICE
CERTIFICATE OF CORRECTION

PATENT NO. : 4,484,099

DATED : November 20, 1984

INVENTOR(S) : TOHRU KAWAI, ET AL.

It is certified that error appears in the above-identified patent and that said Letters Patent is hereby corrected as shown below:

Column 1, line 13, "motion" should read --motor--;
"motor" should read --motion--;

line 40, after "is" insert --its--.

Column 2, line 60, after "by" insert --a--;
line 61, "eliptic" should read --elliptic--.

Column 4, line 27, " $(n_o+174)\lambda_1$ should read $$--(n_o+ 1/4)\lambda_1--.$$

Column 5, line 27, -- $\pi D_2 \approx n_2 \pi$ -- should read $$-- \pi D_2 = n_2 \lambda --.$$

Signed and Sealed this

Twenty-fourth Day of December 1985

[SEAL]

Attest:

DONALD J. QUIGG

Attesting Officer     Commissioner of Patents and Trademarks